(12) United States Patent
Redding et al.

(10) Patent No.: US 11,766,809 B2
(45) Date of Patent: Sep. 26, 2023

(54) METHOD OF FORMING PRE-DEFINED RECESS IN CURED OR CAST EXPLOSIVE COMPOSITION

(71) Applicant: BAE SYSTEMS plc, London (GB)

(72) Inventors: Darren John Redding, Glascoed (GB); Stuart Martin Phillips, Glascoed (GB); Gavin Morgan Davies, Glascoed (GB); Benjamin Mark Davies, Glascoed (GB); Robert John Wilson, Glascoed (GB)

(73) Assignee: BAE Systems PLC, London (GB)

( * ) Notice: Subject to any disclaimer, the term of this patent is extended or adjusted under 35 U.S.C. 154(b) by 71 days.

(21) Appl. No.: 16/977,969

(22) PCT Filed: Mar. 1, 2019

(86) PCT No.: PCT/GB2019/050576
§ 371 (c)(1),
(2) Date: Sep. 3, 2020

(87) PCT Pub. No.: WO2019/171029
PCT Pub. Date: Sep. 12, 2019

(65) Prior Publication Data
US 2021/0055089 A1    Feb. 25, 2021

(30) Foreign Application Priority Data

Mar. 5, 2018   (EP) ...................................... 18275034
Mar. 5, 2018   (GB) ...................................... 1803512

(51) Int. Cl.
*B29C 39/26*    (2006.01)
*B29C 33/46*    (2006.01)
(Continued)

(52) U.S. Cl.
CPC .............. *B29C 39/26* (2013.01); *B29C 33/46* (2013.01); *B29C 39/026* (2013.01);
(Continued)

(58) Field of Classification Search
CPC .. C06B 21/0058; F42B 1/032; F42B 33/0214; F42B 1/036; B29C 39/26; B29C 33/46; B29C 39/026
See application file for complete search history.

(56) References Cited

U.S. PATENT DOCUMENTS 4,450,124 A  *  5/1984  Christmann ........ C06B 21/0041
                                                                    264/3.1
4,920,079 A  *  4/1990  Kaeser ................ C06B 21/0041
                                                                    102/292
(Continued)

FOREIGN PATENT DOCUMENTS

CN          207657030 U      7/2018
DE            2756097 A1     8/1979
(Continued)

OTHER PUBLICATIONS

English Translation of EP 3114426 B1 retrieved Jul. 26, 2022 from Espacenet (Year: 2022).*
(Continued)

*Primary Examiner* — Francisco W Tschen
*Assistant Examiner* — Elisa H Vera
(74) *Attorney, Agent, or Firm* — Finch & Maloney PLLC (57) ABSTRACT

The invention relates to a process for forming a pre-defined recess in a cured or cast explosive composition comprising the steps of:
i) providing a female mould,
ii) providing a male former, and locating said male former proximate to the female mould to create a gap between said male former and female mould,
(Continued)

iii) forming an admixture of a curable/castable explosive composition, charging the gap with the admixture of explosive composition, causing the cure or cast of said curable/castable explosive composition, removing the male former to furnish a cured or cast explosive composition with a pre-defined recess.

20 Claims, 4 Drawing Sheets

(51) Int. Cl.
  *B29C 39/02* (2006.01)
  *C06B 21/00* (2006.01)
  *F42B 1/032* (2006.01)
  *F42B 33/02* (2006.01)

(52) U.S. Cl.
  CPC .......... *C06B 21/0058* (2013.01); *F42B 1/032* (2013.01); *F42B 33/0214* (2013.01)

(56) References Cited

U.S. PATENT DOCUMENTS

| | | | |
|---|---|---|---|
| 11,001,540 B2 | 5/2021 | Stephen et al. | |
| 2001/0050123 A1* | 12/2001 | Espagnacq | C06B 45/12 149/19.92 |
| 2005/0115652 A1* | 6/2005 | Augier | C06B 45/10 149/109.6 |
| 2011/0163479 A1* | 7/2011 | Ferguson | A61M 37/0015 264/442 |
| 2015/0190956 A1* | 7/2015 | Kobune | B29C 33/46 425/556 |

FOREIGN PATENT DOCUMENTS

| | | | |
|---|---|---|---|
| DE | 3232190 A1 * | 3/1987 | ......... C06B 21/0041 |
| DE | 3613507 C1 | 7/1987 | |
| EP | 3114426 B1 * | 5/2018 | ............ F42B 12/207 |
| FR | 1176247 A | 4/1959 | |
| FR | 1578063 A | 8/1969 | |
| GB | 1232923 A | 5/1971 | |
| GB | 1419569 A | 12/1975 | |
| JP | S61121915 A | 6/1986 | |
| JP | H05293860 A | 9/1993 | |
| WO | 2013019898 A1 | 2/2013 | |
| WO | 2019171029 A1 | 9/2019 | |

OTHER PUBLICATIONS

English Translation of DE 3532190 A1 retrieved Jul. 26, 2022 from Espacenet (Year: 2022).*

International Preliminary Report on Patentability received for PCT Application No. PCT/GB2019/050576, dated Sep. 17, 2020. 9 pages.

International Search Report and Written Opinion received for PCT Application No. PCT/GB2019/050576, dated Apr. 3, 2019. 11 pages.

GB Search Report under Section 17(5) received for GB Application No. 1803512.1 dated Nov. 28, 2018. 4 pages.

Extended European Search Report received for EP Application No. 18275034.9, dated Oct. 4, 2018. 8 pages.

* cited by examiner

METHOD OF FORMING PRE-DEFINED RECESS IN CURED OR CAST EXPLOSIVE COMPOSITION

This invention relates to cast and cured explosive compositions, their preparation and use. In particular, the invention relates to the use of providing a predefined recess in such compositions.

Explosives compositions are generally shaped, the shape required depending upon the purpose intended. Shaping can be by casting, pressing, extruding or moulding; casting and pressing being the most common shaping techniques. However, it is generally desirable to cast explosives compositions as casting offers greater design flexibility than pressing.

Polymer-bonded explosives (also known as plastic-bonded explosives and PBX) are typically explosive powders bound into a polymer matrix. The presence of the matrix modifies the physical and chemical properties of the explosive and often facilitates the casting and curing of high melting point explosives. Such explosives could otherwise only be cast using melt-casting techniques. Melt casting techniques can require high processing temperatures as they generally include a meltable binder. The higher the melting point of this binder, the greater the potential hazard. In addition, the matrix can be used to prepare polymer-bonded explosives which are less sensitive to friction, impact and heat; for instance, an elastomeric matrix could provide these properties.

The matrix also facilitates the fabrication of explosive charges which are less vulnerable in terms of their response to impact, shock, thermal and other hazardous stimuli. Alternatively, a rigid polymer matrix could allow the resulting polymer-bonded explosive to be shaped by machining, for instance using a lathe, allowing the production of explosive materials with complex configurations where necessary.

According to a first aspect of the invention there is provided a process for forming a pre-defined recess in a cured or cast explosive composition comprising the steps of:
  i) providing a female mould,
  ii) providing a male former, and locating said male former proximate to the female mould to create a gap between said male former and female mould,
  iii) forming an admixture of a curable/castable explosive composition,
  charging the gap with the curable/castable explosive composition, causing the cure or cast of said a curable/castable explosive composition,
  removing the male former to furnish a cast or cured explosive composition with a pre-defined recess.

The ability to form the pre-defined recess in the final cured or cast explosive composition allows a higher tolerance recess to be achieved. The conventional means of preparing a recess is to machine out a cavity or recess i.e. use a lathe to remove the unwanted cured/cast material. The physical machining and removal of cured/cast explosive composition provides a hazard and increased risk to users of initiation of the cast or cured explosive composition. Further the removed material in the conventional process after machining is generally waste material.

The male former comprises an inner surface and an outer surface, the outer surface contacts said admixture of curable/castable explosive composition. The outer surface may comprise a release agent coated thereon, to assist with removal of the male former from the cured or cast explosive composition.

The release agent may be any explosive compatible release agent. The coating may be a temporary or permanent coating applied to the male former and optionally the female mould. The release agent may be a polymer, fluoropolymers, such as for example Xylan 8840

The male former may have an outer surface of any shape; the shape may be selected to provide the required shape of the thereby formed pre-defined recess. The male former may be manufactured from any suitable material, provided that it is inert with respect to all of the reagents, and especially compatible with the explosive, such that it does not react during the cure or cast process. The male former may not require structural rigidity as there may be no external force applied merely it is retained in place, during the cure or cast process. The male former may be manufactured from metals, alloys, polymers, FRP composite materials, ceramics, and glass.

The pre-defined recess may be of any external profile, shape or volume in the final cured or cast explosive composition. The pre-defined recess may be cylindrical, parabolic, cupola, conical, frustroconical. Preferably the sides of the pre-defined recess may be tapered inwards from the top of the recess to the bottom of the recess, thereby allowing more facile removal of the male former.

The pre-defined recess may then be left as a cavity to allow the cavity to act as a plane wave generator. The recess may be filled with a support structure to prevent collapse of the recess during high g or high spin rates.

The recess may be filled with a filler material, such as a further explosive composition, said further explosive composition may be more sensitive than the cured or cast explosive composition, such that said further explosive composition acts as a booster, such as may be found in an explosive train.

The filler material may be non-energetic, such as a non-explosive compositions. The cavity may be filled with an inert filler, such as a composite.

The filler may be in the form of a liner to provide a shaped charge liner; the shaped charge liner may be selected from copper, tungsten or other high density metals, or reactive materials that are well known in the art.

Alternatively the filler may comprise a fuel or oxidant, to further react with the cured or cast explosive composition when it has been detonated. Fuels, such as metals are well known for providing enhanced blast properties.

In an alternative arrangement the pre-defined recess may comprise a device, such as for example, fuse mechanism, initiator or SAU or electronics, such as those used for setting, guidance, seeking etc.

The removal of the male former from the final cured or cast explosive composition is required to furnish a high tolerance recess.

For PBX compositions, the removal of the former may be carried out when the curable explosive composition has reached a near complete or complete cure. The gelation stage may occur before complete final cure. The appropriate stage of removal will be when the cured explosive composition does not re-assert when the male former is removed. Preferably the male former is removed after full cure or cast of the cured/cast explosive composition.

Whilst the release agent provides a chemical barrier to prevent adhesion between the outer surfaces of the male former, there may still be adhesion. The male former may comprise at least one fluid vent, capable of the transfer of a fluid from an inner surface of the male former to the outer surface of the male former, said fluid being capable of causing ejection of the male former from the cured/cast explosive composition.

The fluid may be a high pressure liquid or a compressed gas, such as for example compressed air, or nitrogen. The use of a compressed gas may prevent contamination of the cured or cast explosive composition.

In a preferred arrangement compressed air is forced through the fluid vent or vents. The pressure may be increased gradually, to aid ejection and to avoid damaging the surface of the cured or cast explosive composition.

The use of a male former allows for the formation of very high tolerance recesses to be formed, much greater than post cure/cast machining. Therefore it is desirable that during the curing/casting stage that the vent holes are covered by a seal, to prevent ingress of curable/castable explosive composition into the vent hole. The seal may preferably be in the form of a removable plug, which is flush fitting to the outer surface of the male former. The removable plug may be secured in place with a resistance fit, tapered shape, screw thread, O-ring seal, such that during the cure/cast process the removable plug is not able to be forced inwardly.

In a preferred arrangement the removable plug is removed inwardly to the inner surface of the male former. Preferable the removable plug is retained in place by an O-ring. Once the removable plug is removed, the vent or vents may then be subjected to the high pressure fluid.

Alternatively, during the removal phase, the high pressure fluid may force the seal or removable plugs outwardly and thereby forcing the male former away from the cured/cast explosive composition.

Other means of securing or fastening the seal or removable plugs may be using a screw thread, biased resilient means, O-rings, or securing plates on the inner surface of the male former, to prevent the seal or removable plug from moving inwardly from the outer surface to the inner surface during the casting or curing process.

The seal may be in the form of a perforation disc (burster disc), such that during the curing or casting stage the disc retains integrity, such that material is prevented from entering the at least one fluid vent however when subjected to the high pressure of a compressed gas or high pressure fluid, the disc perforates and allows through flow of the fluid via the vent hole to force the male former out of the pre-defined recess.

The formed cured or cast explosive composition, after removal of the male former, may then also be removed from the female mould to reveal a final explosive charge. The formed explosive charge may undergo further treatments or modification before being inserted into a munition or container.

The female mould may be the payload cavity of a munition, such that the process is carried out as a "filled in case" procedure. Clearly using conventional techniques such as a lathe to form the recess in a "fill in case" munition would involve loading the case or a large part of a munition into a lathe. This may damage the remainder of the munition, or require support. The method herein defined allows both filling in-case and formation of the high tolerance recess. The combined process reduces the need for further processing steps such as, for example locating the cured or cast composition into the case.

According to a further aspect of the invention there is provided a moulding system for providing a pre-defined recess in a cured/cast explosive composition, comprising a female mould capable of receiving a curable/castable explosive composition, a male former, a support to locate the male former proximate to the female mould to create a gap therebetween, to allow formation of a pre-defined recess within said cured/cast explosive composition using the method as herein before defined.

According to a further aspect of the invention there is provided a munition moulding system for providing a pre-defined recess in a cured/cast explosive composition in a munition, said munition comprising an energetic payload cavity, wherein said payload cavity forms a female mould capable of receiving a curable/castable explosive composition, a male former, a support to locate the male former proximate to the female mould to create a gap therebetween, to provide the pre-defined recess within said cured/cast explosive composition, filling the munition using the method as herein defined.

According to a yet further aspect of the invention there is provided a munition comprising a payload cavity, comprising a cured or cast explosive composition with a high tolerance pre-defined recess therein, which has been filled in-case.

The use of resonant acoustic mixing (RAM) stimulus technique allows the curable/castable explosive composition to be mixed to form a homogenous mixture. The RAM stimulus may be applied to one or more of the female mould, the male former, or case, for fill in-case procedures, or combination thereof. The cast or cure process may comprise the steps of applying resonant acoustic stimulus to the female mould and/or male former, to cause the cure or cast process in the explosive composition.

The delay of the start of cure reaction may allow product quality to be confirmed, before the reaction commences, thereby a poor quality composition, is not filled into mould, pots or munitions. The confinement of the cross linking reagent within a microcapsule may reduce the exposure to operators of hazardous cross linking reagents.

For PBX explosive compositions, WO2017/006110 describes the use of microcapsules to encapsulate cross linking reagents, wherein the microcapsules are thermally labile, such that the mixture when heated may cause rupture of the microcapsule and concomitant release of the cross linking reagent.

The action of the resonant acoustic stimulus may be used to cause the cross linking reagent to be activated or to be released from the microcapsule in WO2017006110.

The rupture of the microcapsules to allow the release of the encapsulated cross linking reagent. The continued application of resonant acoustic stimulus to the curable/castable composition with released cross linking reagent, allows for facile continued mixing of the composition to ensure a homogeneous mixture and a homogenous cured or cast explosive composition.

The curable/castable composition may be mixed in a large batch process of >100 Kg to provide a homogenous mixture and the resonant acoustic stimulus applied directly to the mixing container. The resonant acoustic stimulus will cause the micropsheres to rupture allowing the crosslinking reagent to come into contact with the polymerisable binder, such that cure process starts within the large batch mixer. The curing composition may then be transferred to the munitions or pots for filling, as defined hereinbefore A process for filling a munition with a homogenous crosslinked polymer bonded explosive composition comprising the steps of:
i) forming an admixture of curable or castable explosive composition, said composition comprising an explosive material, a polymerisable binder, a microencapsulated cross linking reagent, said microencapsulated cross linking reagent, comprising a cross linking reagent encapsulated in a microcapsule wherein the microcapsule, comprises at least one shell wall polymer, wherein the microcapsule's shell wall polymer comprises at least one resonant acoustic stimulus labile linkage;

ii) filling a munition, as defined hereinbefore iii) applying resonant acoustic stimulus to the munition, causing the microcapsule to rupture and release said cross linking reagent, to cause the cure process in the munition.

The curable/castable composition may be first formed to an admixture using conventional mixing techniques in a large batch mixer, and transferred to a munition or pot for incorporation into a muniton. Using conventional mixing techniques, it may be extremely difficult to provide continuous mixing to the pre cure composition once it is inside a munition or pot. This would require a plurality of mixing blades to stir the curable/castable composition, in the muntion or pot. However, when filling the gap between the male former and female mould, or male former and pay load cavity of the munition, mixing blades will not be possible.

The curing or casting process may be carried out under vacuum, so as to remove volatiles and degas ie remove air, to prevent the formation of voids in the final cured or cast composition.

The use of resonant acoustic stimulus allows for mixing and rupture of the microcapsules to occur whilst the curable/castable composition is in the munition or pot. The munitions or pots may be individually brought into contact with a resonant acoustic stimulus, or more preferably a plurality of munitions or pots may be arranged in a rack and the rack subjected to the resonant acoustic stimulus.

The resonant acoustic stimulus process may be affected at different frequencies, at a first frequency the resonant acoustic stimulus may provide only homogeneous mixing of the curable/castable composition, but is insufficient to cause rupture of the microcapsules. At an second frequency the resonant acoustic stimulus process provides both homogenous mixing of the curable/castable composition and concomitant rupture of the resonant acoustic stimulus labile microcapsules.

In a highly preferred arrangement the resonant acoustic stimulus labile microcapsules may be caused to rupture at a frequency in the range of from 20 Hz to 100 Hz, more preferably in the range of from 50 Hz to 70 Hz, yet more preferably 58 Hz to 60 Hz. Typically the resonant acoustic stimulus may apply an acceleration force of up to 100 g.

The explosive composition may be a cured PBX.

Polymer-bonded explosives include a polymeric polymerisable binder which forms a matrix bonding explosive particles within. The polymerisable binder thus may be selected from a wide range of polymers, depending upon the application in which the explosive will be used. However, in general at least a portion of the polymerisable binder will be selected such that when cross linked, with a cross linking reagent, to form polyurethanes, cellulosic materials such as cellulose acetate, polyesters, polybutadienes, polyethylenes, polyisobutylenes, PVA, chlorinated rubber, epoxy resins, two-pack polyurethane systems, alkyd/melanine, vinyl resins, alkyds, thermoplastic elastomers such as butadiene-styrene block copolymers, and blends, copolymers and/or combinations thereof.

Energetic polymers may also be used either alone or in combination; these include polyNIMMO (poly(3-nitratomethyl-3-methyloxetane), polyGLYN (poly glycidyl nitrate) and GAP (glycidyl azide polymer). It is preferred that the polymerisable binder component be entirely selected from the list of polymerisable binders above either alone or in combination.

In some embodiments the polymerisable binder will comprise at least partly polyurethane, often the polymerisable binder will comprise 50-100 wt % polyurethane, in some instances, 80-100 wt %. In some embodiments the polymerisable binder will consist of polyurethane.

The cross linking reagents may be selected from a variety of commonly known, cross linking reagents, the selection of which depends on the functionality of the polymerisable binders.

Polyurethanes are a highly preferred polymerisable binder for PBX formation. The polyurethanes may typically be prepared by reacting polyols and polyisocyanates. In a preferred arrangement a monomer or polymer diol may be crosslinked with a cross linking reagent such as isocyanates, such as, for example diisocyanate. The diisocyanate may be such as, for example, MDI (methylene diphenyl diisocyanate) and TDI (toluene diisocyanate) and IPDI (isophorone diisocyanate). IPDI is generally preferred as it is a liquid and hence easy to dispense; it is relatively slow to react, providing a long pot-life and slower temperature changes during reaction; and it has a relatively low toxicity compared to most other isocyanates. It is also preferred that, where the polymerisable binder comprises polyurethane, the polyurethane polymerisable binder includes a hydroxyterminated polybutadiene. The polyisocyanate may be dissolved in a minimal aliquot of solvent.

The explosive component of the polymer-bonded explosive may, in certain embodiments, comprise one or more heteroalicyclic nitramine compounds. Nitramine compounds are those containing at least one N—NO$_2$ group. Heteroalicyclic nitramines bear a ring containing N—NO$_2$ groups. Such ring or rings may contain for example from two to ten carbon atoms and from two to ten ring nitrogen atoms. Examples of preferred heteroalicyclic nitramines are RDX (cyclo-1,2,3-trimethylene-2,4,6-trinitramine, Hexogen), HMX (cyclo-1,3,5,7-tetramethylene-2,4,6,8-tetranitramine, Octogen), and mixtures thereof. The explosive component may additionally or alternatively be selected from TATND (tetranitro-tetraminodecalin), HNS (hexanitrostilbene), TATB (triam inotrinitrobenzene), NTO (3-nitro-1,2,4-triazol-5-one), HNIW (2,4,6,8,10,12-hexanitrohexaazaisowurtzitane), GUDN (guanyldylurea dinitride), FOX-7 (1,1-diamino-2, 2-dinitroethene), and combinations thereof.

Other highly energetic materials may be used in place of or in addition to the compounds specified above. Examples of other suitable known highly energetic (explosive) materials include picrite (nitroguanidine), aromatic nitramines such as tetryl, ethylene dinitramine, and nitrate esters such as nitroglycerine (glycerol trinitrate), butane triol trinitrate or pentaerythritol tetranitrate, DNAN (dinitroanisole), trinitrotoluene (TNT), inorganic oxidisers such as ammonium salts, for instance, ammonium nitrate, ammonium dinitramide (ADN) or ammonium perchlorate, and energetic alkali metal and alkaline earth metal salts.

In a further arrangement there may be provided a further stimulus, such as, for example a further chemical stimulus and/or further physical stimulus.

The further stimulus may be one or more of, such as, for example, pressure, heat, ultrasound, UV radiation, catalyst, or a shear force.

The explosive of the polymer-bonded explosive may be in an admixture with a metal powder which may function as a fuel or which may be included to achieve a specific terminal effect. The metal powder may be selected from a wide range of metals including aluminium, magnesium, tungsten, alloys of these metals and combinations thereof. Often the fuel will be aluminium or an alloy thereof; often the fuel will be aluminium powder.

The polymer-bonded explosive may be present in greater than 75 wt % more preferably greater than 88 wt %. The polymer bonded explosive may be in the range about 75-95 wt %, more preferably 88 to 95 wt %.

In some embodiments, the polymer-bonded explosive comprises RDX. The polymer-bonded explosive may comprise RDX as the only explosive component, or in combination with a secondary explosive component, such as HMX. Preferably, RDX comprises 50-100 wt % of the explosive component.

In many cases the polymerisable binder will be present in the range about 5-20 wt % of the polymer-bonded explosive, often about 5-15 wt %, or about 8-12 wt %. The polymer bonded explosive may be 88 wt %, and about 12% wt binder, such as, for example 88 wt % RDX and about 12 wt % polyurethane binder. However, the relative levels of RDX to polyurethane binder may be in the range about 75-95 wt % RDX and 5-25 wt % polyurethane binder. Polymer-bonded explosives of this composition are commercially available, for example, Rowanex 1100™.

The use of a defoamer may remove voids from the formulation. Many defoaming agents are known and in general any defoaming agent or combination thereof which does not chemically react with the explosive may be used. In many embodiments, the polysiloxane is selected from polyalkyl siloxanes, polyalkylaryl siloxanes, polyether siloxane co-polymers, and combinations thereof. It is often preferred that the polysiloxane be a polyalkylsiloxane; polydimethylsiloxane may typically be used. Alternatively, the defoaming agent may be a combination of silicone-free surface active polymers, or a combination of these with a polysiloxane. Such silicone-free polymers include alkoxylated alcohols, triisobutyl phosphate, and fumed silica. Commercially available products which may be used include, BYK 088, BYK A500, BYK 066N and BYK A535 each available from BYK Additives and Instruments, a subdivision of Altana; TEGO MR2132 available from Evonik; and BASF SD23 and SD40, both available from BASF. Of these, BYK A535 and TEGO MR2132 are often used as they are solventless products with good void reduction properties.

Often the defoaming agent is present in the range about 0.01-2 wt %, in some instances about 0.03-1.5 wt %, often about 0.05-1 wt %, in many cases about 0.25 or 0.5-1 wt %. At levels below this (i.e. below 0.01 wt %) there is often insufficient defoaming agent in the composition to significantly alter the properties of the polymer-bonded explosive, whereas above this level (i.e. above 2 wt %) the viscosity of the cast solution may be so low that the composition becomes inhomogeneous as a result of sedimentation and segregation processes occurring within the mixture.

The curable explosive composition may include a solvent, any solvent in which at least one of the components is soluble and which does not adversely affect the safety of the final product may be used, as would be understood by the person skilled in the art. However, it is preferred, for the reasons described above, that in some embodiments that solvent be absent.

Where present, the solvent may be added as a carrier for the components of the composition. The solvent will typically be removed from the explosive composition during the curing process, however some solvent residue may remain due to imperfections in the processing techniques or where it becomes uneconomical to remove the remaining solvent from the composition. Often the solvent will be selected from diisobutylketone, polypropylene glycol, isoparaffins, propylene glycol, cyclohexanone, butyl glycol, ethylhexanol, white spirit, isoparaffins, xylene, methoxypropylacetate, butylacetate, naphthenes, glycolic acid butyl ester, alkyl benzenes and combinations thereof. In some instances, the solvent is selected from diisobutylketone, polypropylene glycol, isoparaffins, propylene glycol, isoparaffins, and combinations thereof.

The composition may also contain minor amounts of other additives commonly used in explosives compositions. Examples of these include microcrystalline wax, energetic plasticisers, non-energetic plasticisers, anti-oxidants, catalysts, curing agents, metallic fuels, coupling agents, surfactants, dyes and combinations thereof. Energetic plasticisers may be selected from eutectic mixtures of alkylnitrobenzenes (such as dinitro- and trinitro-ethyl benzene), alkyl derivatives of linear nitramines (such as an N-alkyl nitratoethyl-nitramine, for instance butyl-NENA), and glycidyl azide oligomers.

Further, compositions including polymer-bonded explosives and hydroxyterminated polybutadiene binders in particular, are more elastomeric when cast than when pressed. This makes them less prone to undergoing a deflagration-to-detonation transition when exposed to accidental stimuli. Instead, such systems burn without detonating, making them safer to use than pressed systems.

In some cases the plasticiser will be absent; however the plasticiser where present may typically be present in the range 0-10 wt % of the plasticiser and curable explosive composition, often in the range 0.01-8 wt %, on occasion 0.5-7 wt % or 4-6 wt %. The plasticiser will often be a non-energetic plasticiser, many are known in the art; however energetic plasticisers may also be used in some instances. The cured explosive composition of the invention has utility both as a main charge or a booster charge in an explosive product. Often the composition will be the main charge. The composition of the invention may be used in any "energetic" application such as, for example, uses include mortar bombs and artillery shells as discussed above. Additionally, the inventive composition may be used to prepare explosives for gun-launch applications, explosive filings for bombs and warheads, propellants, including composite propellants, base bleed.

An embodiment of the invention will now be described by way of example only and with reference to the accompanying drawings of which:—

FIG. 1 shows a

Figure 1:
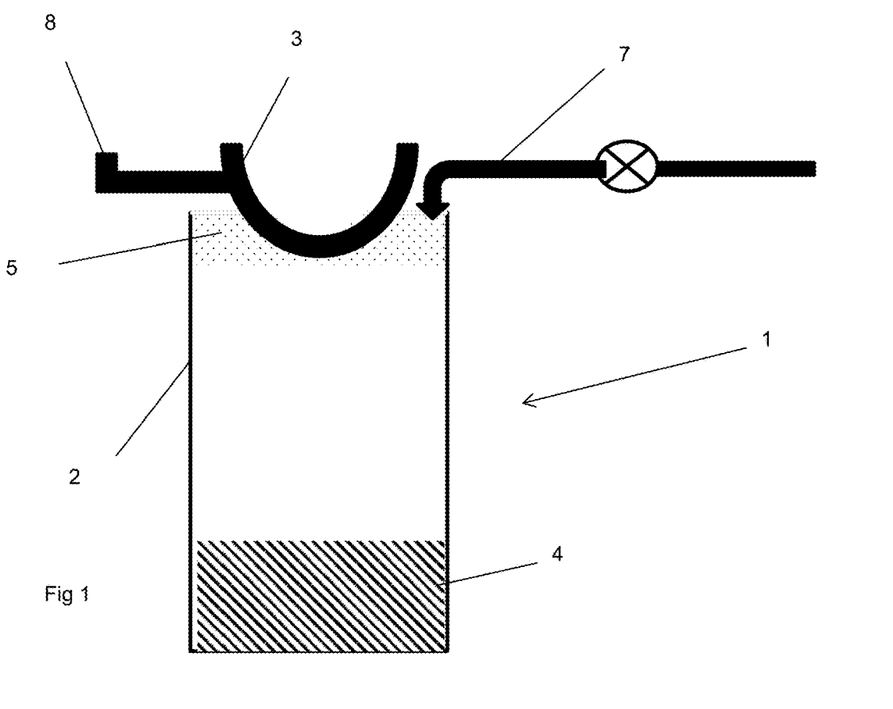

Turning to FIG. 1, there is shown a filling arrangement 1, comprising a female mould 2, and a male former 3. The male former 3 is held in location by a support 8, such as to create a gap (area) 5 therebetween. Curable explosive composition 4, is dispensed, such as via a pipe 7, to fill the female mould 2.

Figure 2:
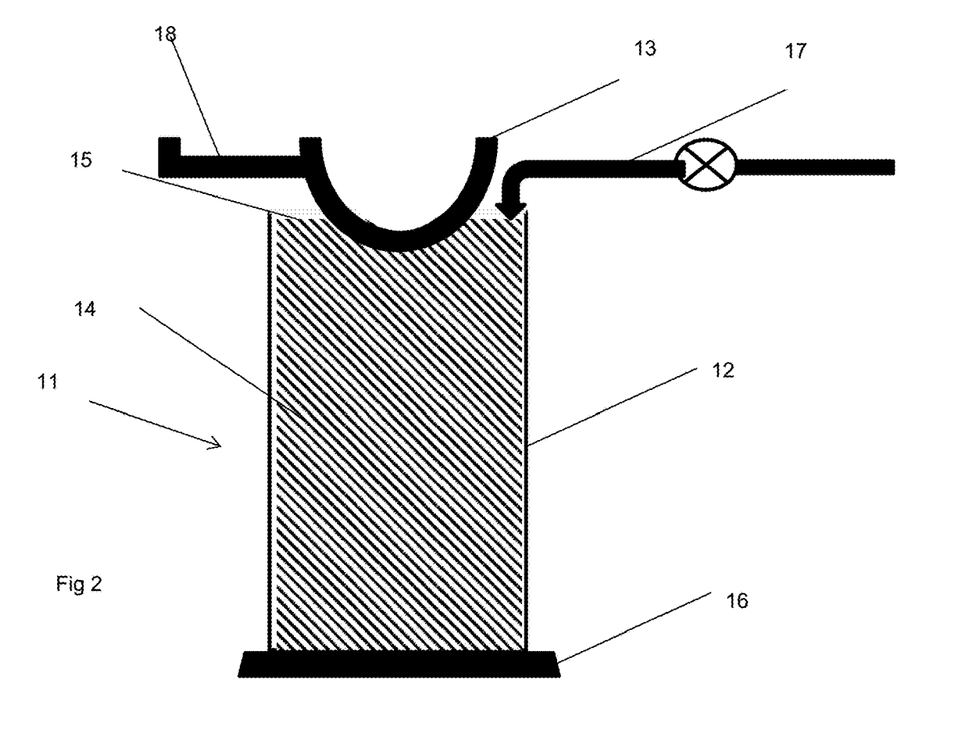

Turning to FIG. 2, there is shown a filling arrangement 11, comprising a female mould 12, and a male former 13. The male former 13 is held in location by a support 18. The gap therebetween is filled via a pipe 17, with curable explosive composition 14, up to a fill mark 15.

The curable (that is uncured) explosive composition 14, is caused to cure, by the addition of a stimuli, such as a cross linking agent. Further there may be other stimuli 16 applied to aid cure and mixing, such as RAM or thermal regulators, to apply heat or cool the curing explosive composition.

Figures 3A, 3B, 3C:
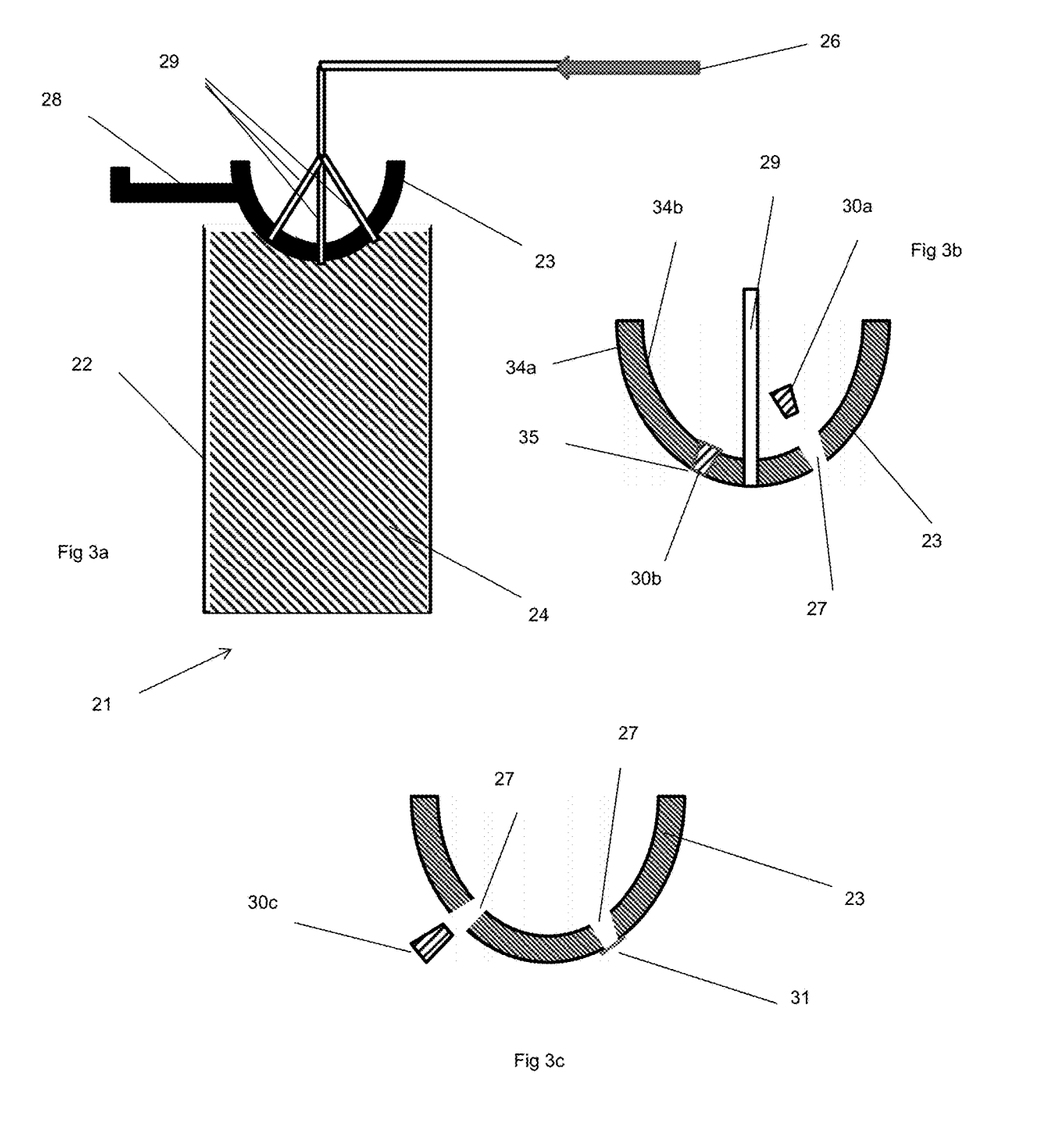

Turing to FIG. 3a, there is shown a filling arrangement 21, comprising a female mould 22, and a male former 23. The male former 3 is held in location by a support 28. The curable explosive composition, has reached a cured explosive state 24, such that removal of the male former may be undertaken.

Turning to FIG. 3*b* the male former 23 will have a seal 30*a*, such as a removable plug 30*b*, or a burster disc 31, as shown in FIG. 3*c*. The seal 30*a* will have a flush fitting surface 35 to the outside surface 34*a* of the male former 23. The removal of the seal 30*a*, provides a through-hole 27, from the inner surface 34*b* to the outer surface 34*a* of the male former 23, through which a high pressure fluid 26 may be passed, via one or more pipes 29. To further aid separation a release agent 36 may be applied to the outer surface 34*a* of the male former 23.

Turning to FIG. 3*c* there is provided an alternative removable plug 30*c*, which is removable outwardly from the male former 23, the high pressure fluid may force the removable plug outwardly, but care needs to be taken to avoid damaging the cured explosive formulation.

Turning back to FIG. 3*a*, there may be a plurality of pipes 29, and the high pressure fluid 26, such as compressed air, is forced therethrough to cause separation of the male former 23 from the cured explosive 24.

Figure 4:
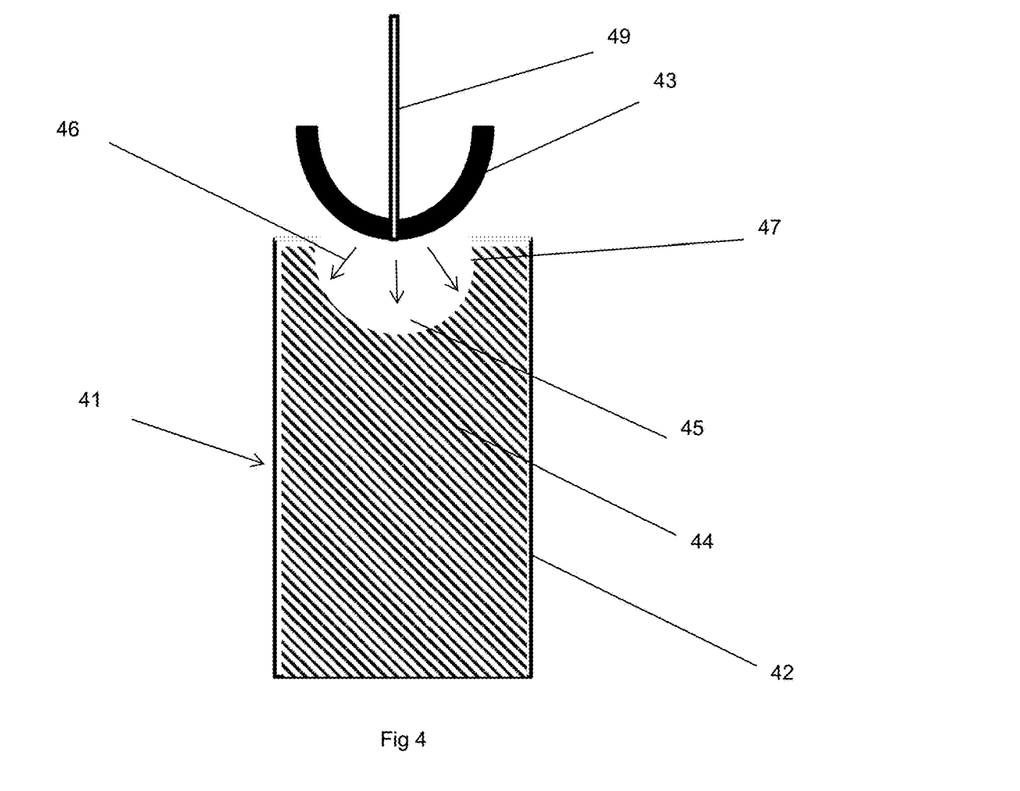

Turning to FIG. 4, there is shown a filling arrangement 41, comprising a female mould 42, and a male former 43. The male former 43 has been forced away from the cured explosive composition 44, by application of the high pressure fluid 46 flowing out from the pipes 49. The removed male former 43, furnishes a recess, cavity 45, with a surface shape 47 which is determined by the shape of the outer surface of the male former. 43

Figure 5:
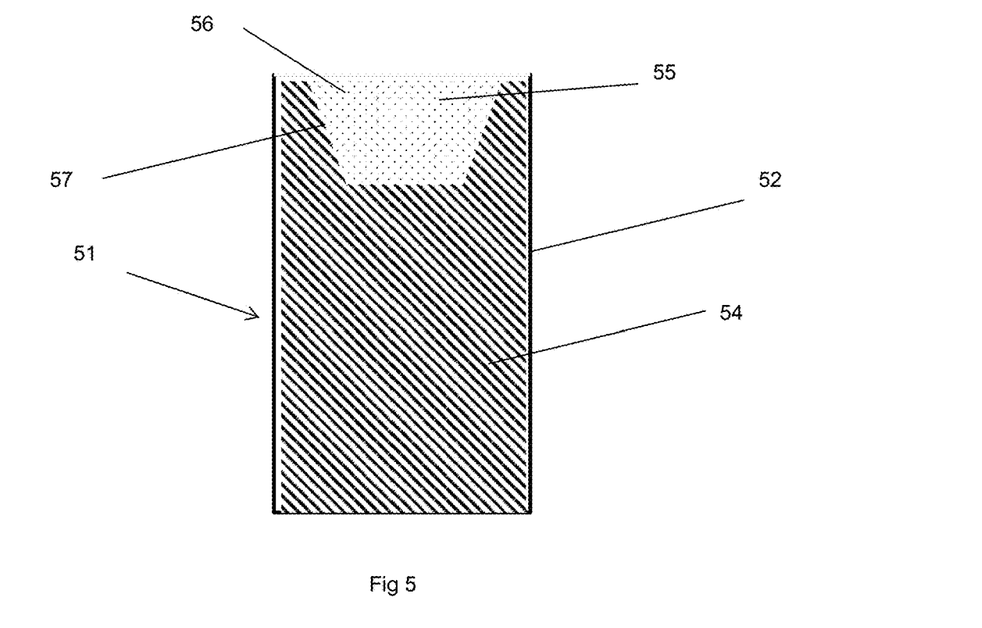

Turning to FIG. 5, there is provided a filled munition 51, with a munitions case 52 (acting as the female mould), with the cured explosive composition 54, having been filled in case. The cavity 55 has a trapezoidal shape, with sloping sides 57. The cavity has been filled with a filler material 56. The filler material may be fuel, metals, other energetic materials, or non-energetic materials, or a further booster explosive.

Figure 6:
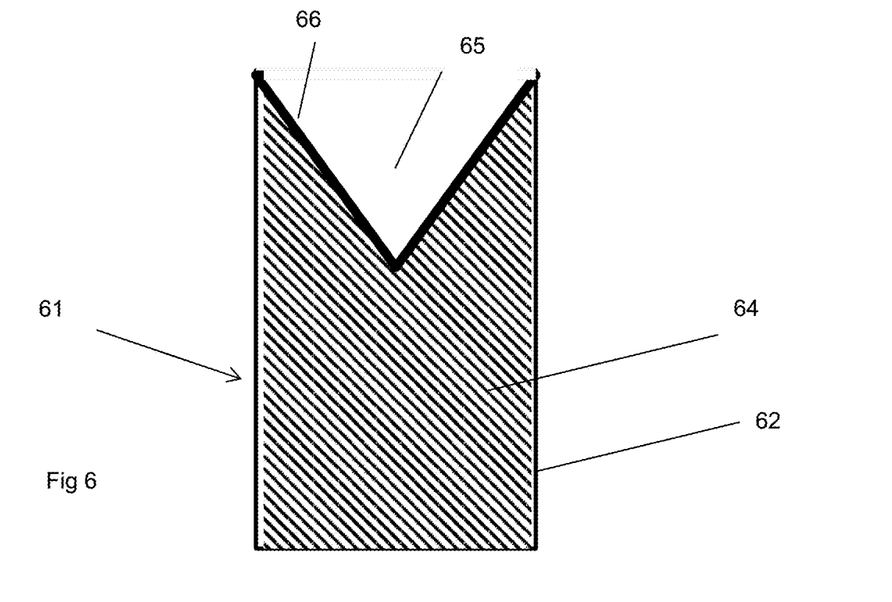

Turning to FIG. 6 there is provided a shaped charge device 61, which comprises a munition case 62, and a cured explosive composition 64. The cavity 65 has been formed into a conventional conical shape, and a metal liner 66 has been located, deposed, pressed, formed, thereon.

Figure 7:
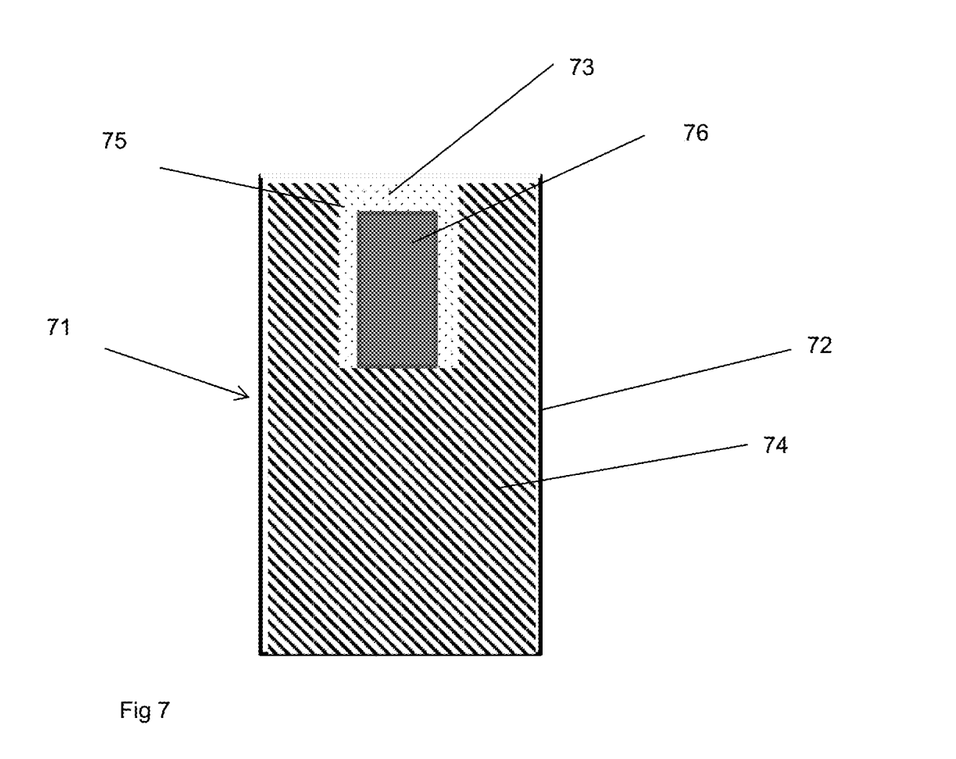

Turning to FIG. 7 there is provided a munition 71, with a case 72 and a cured explosive composition 74. The cavity 75 comprises a device 76, which may be a sensor, fuse, SAU, initiator, etc. The device 76 may be potted in 73 to prevent movement of the device 76, with inert polymer or further PBX.

The invention claimed is:

1. A process for forming a recess in a cured or cast explosive composition, the process comprising:
    providing a female mould;
    providing a male former having an outer surface and an inner surface, and locating said male former proximate to the female mould to create a gap between said male former and female mould;
    forming an admixture of a curable/castable explosive composition;
    charging the gap with the admixture of explosive composition;
    causing the cure or cast of said curable/castable explosive composition; and
    removing the male former to furnish a cured or cast explosive composition with a recess, the recess being in a location occupied by at least a portion of the male former prior to the removal of the male former;
    wherein the male former comprises at least one fluid vent that extends between the outer and inner surfaces of the male former; and
    wherein a seal of the at least one fluid vent comprises a removable plug that is removable from the vent.

2. The process according to claim 1, wherein the male former comprises an outer surface, which contacts said curable/castable explosive composition, wherein said outer surface comprises a release agent coated thereon.

3. The process according to claim 1, wherein the at least one fluid vent is capable of transfer of a fluid through the male former, said fluid causing ejection of the male former from the cured or cast explosive composition.

4. The process according to claim 3, wherein the at least one fluid vent is sealed by the removable plug, during the charging.

5. The process according to claim 4, wherein the male former comprises an outer surface, and wherein the removable plug is flush fitting to the outer surface of the male former, and wherein the removable plug is removed from the vent during the transfer of the fluid through the male former.

6. The process according to claim 1, the process further comprising applying resonant acoustic stimulus to the female mould and/or male former.

7. The process according to claim 1, wherein the female mould is a payload cavity of a munition, wherein said curable/castable explosive composition comprises an explosive material, a polymerisable binder, and a cross linking reagent.

8. The process according to claim 7, wherein the polymerisable binder is selected, such that it will form with the cross linking reagent a polyurethane, a cellulosic material, cellulose acetate, a polyester, a polybutadiene, a polyethylene, a polyisobutylene, PVA, chlorinated rubber, an epoxy resin, a two-pack polyurethane system, an alkyd/melanine, a vinyl resin, an alkyd, a thermoplastic elastomer, a butadiene-styrene block copolymer, polyNIMMO, polyGLYN, GAP, and a blend, copolymer and/or combination thereof.

9. The process according to claim 7, wherein the explosive material is selected from RDX, HMX, FOX-7, TATND, HNS, TATB, NTO, HNIW, GUDN, picrite, an aromatic nitramine, tetryl, ethylene dinitramine, nitroglycerine, butane triol trinitrate, pentaerythritol tetranitrate, DNAN trinitrotoluene, an inorganic oxidiser, ammonium nitrate, ADN, ammonium perchlorate, an energetic alkali metal salt, an energetic alkaline earth metal salt, and combinations thereof.

10. The process according to claim 1, wherein locating said male former proximate to the female mould includes retaining the male former at a location proximate to the female mould, and wherein the process further comprises:
    retaining the location of the male former while (i) the gap is being charged with the admixture of the curable/castable explosive composition, and (ii) the curable/castable explosive composition is being cured or casted.

11. The process according to claim 10, wherein the recess is formed based on the male former being in the location, while the curable/castable explosive composition is being cured or casted.

12. The process according to claim 1, wherein charging the gap comprises:
    charging the gap with the admixture of the curable/castable explosive composition, through an opening between the female mould and the male former.

13. The process according to claim 1, wherein the recess has a shape that is substantially similar to a shape of a surface of the male former facing the female mould during said charging of the gap.

14. A moulding system for providing a pre-defined recess in a cured or cast explosive composition, the system comprising:
- a female mould capable of receiving a curable/castable explosive composition;
- a male former having an outer surface and an inner surface, wherein the male former comprises at least one fluid vent that extends between the outer and inner surfaces of the male former, and wherein a seal of the at least one fluid vent comprises a removable plug that is removable from the vent; and
- a support to locate the male former proximate to the female mould in a location, to create a gap therebetween, to allow the formation of a pre-defined recess within said cured/cast explosive composition;
- wherein, in use of the system, the gap is charged with the curable/castable explosive composition, and post cure/cast the male former is removed from proximate to the female mould to furnish a cured or cast explosive composition with the pre-defined recess;
- wherein the support is further to retain the same location of the male former proximate to the female mould, while (i) the gap is being charged with the curable/castable explosive composition, and (ii) the curable/castable explosive composition is being cured/casted.

15. The moulding system according to claim 14, wherein the male former comprises an inner surface and an outer surface, said outer surface contacts said curable/castable explosive composition, wherein said male former further comprises at least one vent hole, which allows the through flow of a fluid from an inner surface to an outer surface of said male former, and wherein the female mould comprises an energetic payload cavity of a munition.

16. A process for forming a pre-defined recess in a cured or cast explosive composition, the process comprising:
- locating a male former proximate to a female mould to create a gap between said male former and female mould;
- forming an admixture of a curable/castable explosive composition;
- charging the gap with the admixture of explosive composition;
- causing the cure or cast of said curable/castable explosive composition;
- applying resonant acoustic stimulus at a frequency in the range of 20 Hz to 100 Hz to the female mould and/or male former; and
- removing the male former to furnish a cured or cast explosive composition with a pre-defined recess.

17. The process according to claim 16, wherein the male former comprises an outer surface, which contacts said curable/castable explosive composition, wherein said outer surface comprises a release agent coated thereon.

18. The process according to claim 16, wherein the male former comprises at least one fluid vent, capable of the transfer of a fluid through the male former, said fluid causing ejection of the male former from the cured or cast explosive composition, wherein the at least one fluid vent is sealed during the charging, wherein the male former comprises an outer surface, and wherein the seal of the at least one fluid vent comprises a removable plug, which is flush fitting to the outer surface of the male former.

19. The process according to claim 16, wherein:
- the female mould is a payload cavity of a munition;
- the curable/castable explosive composition comprises an explosive material, a polymerisable binder, and a cross linking reagent;
- the polymerisable binder is selected, such that it will form with the cross linking reagent a polyurethane, a cellulosic material, cellulose acetate, a polyester, a polybutadiene, a polyethylene, a polyisobutylene, PVA, chlorinated rubber, an epoxy resin, a two-pack polyurethane system, an alkyd/melanine, a vinyl resin, an alkyd, a thermoplastic elastomer, a butadiene-styrene block copolymer, polyNIMMO, polyGLYN, GAP, and a blend, copolymer and/or combination thereof; and
- the explosive material is selected from RDX, HMX, FOX-7, TATND, FINS, TATB, NTO, HNIW, GUDN, picrite, an aromatic nitramine, tetryl, ethylene dinitramine, nitroglycerine, butane triol trinitrate, pentaerythritol tetranitrate, DNAN trinitrotoluene, an inorganic oxidiser, ammonium nitrate, ADN, ammonium perchlorate, an energetic alkali metal salt, an energetic alkaline earth metal salt, and combinations thereof.

20. The process according to claim 16, wherein resonant acoustic stimulus applies an acceleration force of up to 100 g.

* * * * *

UNITED STATES PATENT AND TRADEMARK OFFICE
CERTIFICATE OF CORRECTION

| | |
|---|---|
| PATENT NO. | : 11,766,809 B2 |
| APPLICATION NO. | : 16/977969 |
| DATED | : September 26, 2023 |
| INVENTOR(S) | : Darren John Redding et al. |

It is certified that error appears in the above-identified patent and that said Letters Patent is hereby corrected as shown below:

On the Title Page

Item (54) and in the Specification Column 1, Lines 1-3 Title Should read: PRE-DEFINED RECESS Signed and Sealed this
Twelfth Day of December, 2023

Katherine Kelly Vidal
*Director of the United States Patent and Trademark Office*